United States Patent
Simske et al.

(10) Patent No.: US 7,734,554 B2
(45) Date of Patent: Jun. 8, 2010

(54) DEPLOYING A DOCUMENT CLASSIFICATION SYSTEM

(75) Inventors: Steven J. Simske, Fort Collins, CO (US); Margaret M. Sturgill, Fort Collins, CO (US); Daniel J. Dyer, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 867 days.

(21) Appl. No.: 11/260,786

(22) Filed: Oct. 27, 2005

(65) Prior Publication Data

US 2007/0100812 A1  May 3, 2007

(51) Int. Cl.
G06E 1/00 (2006.01)
G06E 3/00 (2006.01)
(52) U.S. Cl. .......................................... 706/20; 715/783
(58) Field of Classification Search ................... 706/20; 707/6; 715/853

See application file for complete search history.

(56) References Cited

U.S. PATENT DOCUMENTS

| 5,983,246 | A | | 11/1999 | Takano | |
|---|---|---|---|---|---|
| 6,128,613 | A | * | 10/2000 | Wong et al. | 707/7 |
| 6,768,816 | B2 | | 7/2004 | Hall, Jr. et al. | |
| 2002/0091776 | A1 | * | 7/2002 | Nolan et al. | 709/206 |
| 2003/0226108 | A1 | | 12/2003 | Oezgen | |
| 2004/0015775 | A1 | | 1/2004 | Simske et al. | |
| 2004/0117367 | A1 | | 6/2004 | Smith et al. | |
| 2004/0177319 | A1 | | 9/2004 | Horn | |
| 2005/0005237 | A1 | | 6/2005 | Rail et al. | |
| 2006/0294099 | A1 | * | 12/2006 | Tsukamoto | 707/7 |

OTHER PUBLICATIONS en.wikitionary.org/cost_fuction, Sep. 29, 2007.*

* cited by examiner

*Primary Examiner*—David R Vincent
*Assistant Examiner*—Kalpana Bharadwaj
(74) *Attorney, Agent, or Firm*—Nathan R. Rieth (57) ABSTRACT

A system and method for deploying a document classification system include deploying a document classification system with a first classification engine configuration, and thereafter, automatically redeploying the document classification system with a second classification engine configuration in response to a cost function.

18 Claims, 4 Drawing Sheets

Classification Result /
Ranked Classification List 206

| Document Classification | Probability Classified Correct |
|---|---|
| Insurance Claim Form | 90% |
| Loan Application | 80% |
| Pay Stub | 60% |
| . | |
| . | |
| . | |

DEPLOYING A DOCUMENT CLASSIFICATION SYSTEM

BACKGROUND

Advances in computer technology have provided users with numerous options for creating electronic documents. For example, many common software applications executable on a typical personal computer enable users to generate various types of useful electronic documents. Electronic documents can also be obtained from image acquisition devices such as scanners or digital cameras, or they can be read into memory from a data storage device (e.g., in the form of a file). Modern computers enable users to electronically obtain or create vast numbers of documents varying in size, subject matter, and format. Such documents may be located, for example, on personal computers, networks, or other storage media.

As the number of electronic documents grows, the ability to classify and manage such documents (e.g., through the use of networks such as the Internet) becomes increasingly important. Document classification enables users to more easily locate related documents and is an important step in a variety of document processing tasks such as archiving, indexing, re-purposing, data extraction, and other automated document managing operations. In general, document classification involves assigning a document to one or more sets or classes of documents with which it has commonality-usually as a consequence of shared topics, concepts, ideas and subject areas.

A variety of document classification engines or algorithms have been developed in recent years. Performance of these engines varies from engine to engine, but is generally limited due to computers being historically poor at performing heuristic tasks. Common commercial document classifier engines use a single technology and approach for solving the problem of classifying documents. Expert users can tune these classifier engines to obtain better results, but this requires significant training of such engines using high quality example documents.

BRIEF DESCRIPTION OF THE DRAWINGS

The same reference numerals are used throughout the drawings to reference like components and features.

DETAILED DESCRIPTION

Introduction

The following discussion is directed to an adaptive system for document classification and indexing that includes a redeployable document classifier component. A cost function automatically updates or redeploys a classifier engine (or pattern of engines) within the document classifier in response to changes in various cost metrics that make up the cost function. The system adapts automatically to changes in various cost factors in order to deploy and implement different classification engines (or different patterns of classification engines) that it determines will provide a more accurate classification result given various user preferences and a set of ground truth data available to the system. The cost function used in determining which classification engine or pattern to deploy is derived from various cost factors including, for example, the throughput of documents in the system, the minimum distance a classified document is away from its correct or assigned classification, the severity of errors made in classifying and indexing a document, licensing issues regarding the use of classification engines, the particular type of ground truth document being analyzed, the retraining of the system based on additional documents added to the set of ground truth documents, and the relative amount of resources available for classification processing on the front end of the system and indexing processing on the back end of the system. The system is therefore responsive to both changes in end-user expectations regarding various cost factors, and to the changing nature of the set of ground truth documents used to train the system.

Exemplary Embodiments

Figure 1:
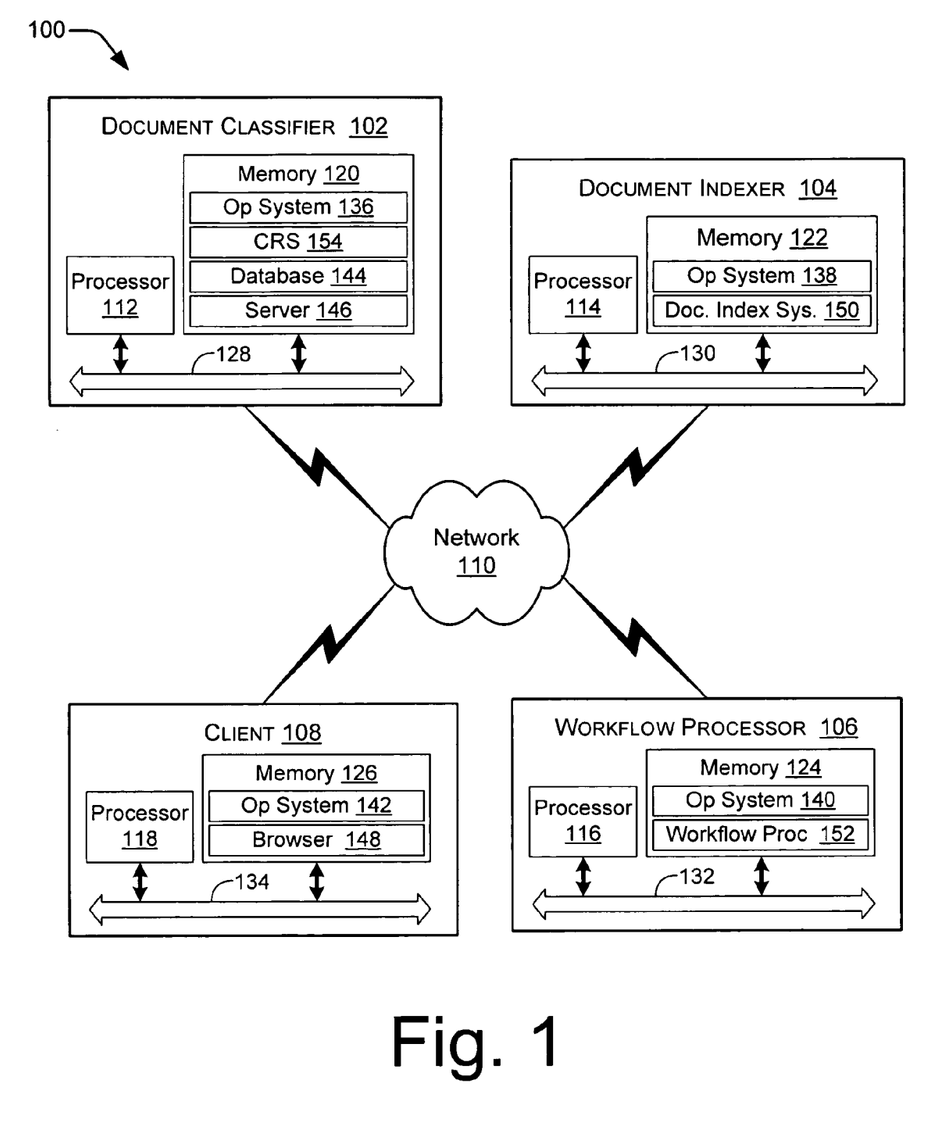
FIG. 1 illustrates an exemplary embodiment of a document classification and indexing system.

FIG. 1 illustrates a block diagram of an exemplary document classification and indexing system 100 which represents one suitable environment for implementing an adaptive document classifier. The exemplary classification and indexing system 100 includes an adaptive document classifier 102, a document indexer 104, a workflow processor 106, and a client device 108 operably coupled to one another via a network 110. Network 110 can include both local and remote connections and is intended to represent any of a variety of conventional network topologies and types (including optical, wired and/or wireless networks), employing any of a variety of conventional network protocols (including public and/or proprietary protocols). Thus, network 110 may include, for example, any one or a combination of a modem, a cable modem, a LAN (local area network), a WAN (wide area network), an intranet, the Internet, a USB cable, or any other suitable communication link.

In general, the document classifier 102 is configured to identify one or more of a number of classifications with which a scanned document to be indexed is most closely aligned or associated. The document classifier 102 is initially deployed with a default classification engine configuration, or pattern, and it classifies a document as belonging to a respective one of these classifications. In addition, as it classifies documents, the document classifier 102 is capable of redeploying itself in an adaptive manner to achieve desirable classification results in response to varying cost factors such as, for example, user preferences, classification accuracy, a changing set of ground truth documents, and licensing requirements. The document classifier 102 may be implemented as various devices having appropriate computing capacity for performing document classification and related tasks as discussed herein. Such devices may include, for example, desktop personal computers (PCs), notebook or portable computers, workstations, mainframe computers, Internet appliances, print servers, handheld PCs, combinations thereof, and so on. Such devices may also include devices capable of generating the scanned document to be indexed, such as a scanner, a copier, a multifunction peripheral device, and so on.

The document indexer 104 is generally configured to receive a document from the document classifier 102 and to "index" the document for storage in a database or for application to a particular workflow processor 106. The concept of "indexing" a document generally refers to the process of extracting indices (salient information) from the document. The workflow processor 106 is configured to perform one or more tasks upon a set of indices extracted from a document by the document indexer 104. The client 108 is generally configured to provide a user with access information and user interfaces from the document classifier 102 and document indexer 104. The client 108 and workflow processor 106 are each representative of what may be multiple clients 108 or multiple workflow processors 106 that are coupled to network 110 and in data communication with the document classifier 102 and document indexer 104. The document indexer 104, workflow processor 106, and client 108, may each be implemented, for example, as any of a variety of conventional computing devices, including desktop personal computers (PCs), notebook or portable computers, workstations, mainframe computers, Internet appliances, handheld PCs, combinations thereof, and so on. It is noted that although the document classifier 102, document indexer 104, workflow processor 106, and client 108 are illustrated and discussed herein as being distinct devices, they may also be implemented in a more integrated manner using fewer devices or even a single device.

Referring again to FIG. 1, the document classifier 102, document indexer 104, workflow processor 106, and client 108 each include a processor and memory (112, 114, 116, 118, and 120, 122, 124, 126, respectively), both of which are coupled to a local interface (128, 130, 132, 134, respectively). The local interface may be, for example, a data bus with an accompanying control/address bus, as can be appreciated by those skilled in the art. Stored within each of the memories (120, 122, 124, 126) and executable by respective processors (112, 114, 116, 118) are various components. In general, the term "executable" means a program file that is in a form that can ultimately be run by the respective processors 112, 114, 116, and 118. Examples of executable programs include a compiled program that can be translated into machine code in a format that can be loaded into a random access portion of the memories 120, 122, 124, and 126, and run by the respective processors 112, 114, 116, and 118, or source code that may be expressed in proper format such as object code that is capable of being loaded into a random access portion of the memories 120, 122, 124, and 126 and executed by the respective processors 112, 114, 116, and 118. An executable program may be stored in any portion or component of each the memories 120, 122, 124, and 126 including, for example, random access memory, read-only memory, a hard drive, compact disk (CD), floppy disk, or other memory components.

In this respect, each of the memories 120, 122, 124, and 126 is defined herein as both volatile and nonvolatile memory and data storage components. Volatile components are those that do not retain data values upon loss of power. Nonvolatile components are those that retain data upon a loss of power. Thus, each of the memories 120, 122, 124, and 126 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each of the processors 112, 114, 116, and 118 may represent multiple processors and each of the memories 120, 122, 124, and 126 may represent multiple memories that operate in parallel processing circuits, respectively. In such a case, each of the local interfaces 128, 130, 132, and 134 may be an appropriate network that facilitates communication between any two of the multiple processors, between any processor and any of the memories, or between any two of the memories. Processors 112, 114, 116, and 118 may be of electrical or optical construction, or of some other construction, as can be appreciated by those of ordinary skill in the art.

In addition to executable and other components discussed herein, the document classifier 102, document indexer 104, workflow processor 106, and client 108 may each include various peripheral devices (not shown) such as, for example, keyboards, keypads, touch pads, touch screens, microphones, a mouse, joysticks, or one or more push buttons, and so on. Such peripheral devices may also include display devices, indicator lights, speakers, printers, and the like.

Examples of components stored within memories (120, 122, 124, 126) and executable by respective processors (112, 114, 116, 118) include operating systems (136, 138, 140, 142), a database 144 and server 146 as illustrated in the document classifier 102 memory 120, a browser 148 as illustrated in client 108 memory 126, a document indexing system 150 as illustrated in the document indexer 104 memory 122, a workflow processing system 152 as illustrated in the workflow processor 106 memory 124, and other applications and/or modules configured to perform various tasks relevant to the device on which they are located.

Each of the operating systems (136, 138, 140, 142) executes in general to control the allocation and usage of hardware resources such as the memory, processing time and peripheral devices, respectively, in the document classifier 102, the document indexer 104, the workflow processor 106 and the client 108. In this manner, each of the operating systems (136, 138, 140, 142) serves as the foundation on which various components and applications depend as is generally known by those with ordinary skill in the art.

In this respect, the browser 148 on client 108 facilitates access to information and user interfaces in the document classifier 102 through the network server 146. Specifically, by manipulating the browser 148 of the client 108, a user can access information (e.g., from database 144) and user interfaces from the document classifier 102 through the server 146. It is noted that browser 148 is provided as one example of any number of applications or programs that may be employed in the client 108 to gain access to interfaces and other functionality in both the document classifier 102 and the document indexer 104. Accordingly, the browser 148 may be interchangeable with a client graphical user interface and other appropriate network access software.

The workflow processing system 152 stored in memory 124 of workflow processor 106 is executable to perform one or more tasks upon a set of indices extracted from a document by document indexer 104.

Another example of such an executable component/application, stored on document classifier 102 in memory 120 and executable by processor 112, is the classification and redeployment system (CRS) 154. The CRS 154 is executable by processor 112 for classifying documents and optimizing the performance of the document classification and indexing system 100 by redeploying classification engine configurations within the document classifier 102 according to a cost function, as will be described. The CRS 154 switches between various classification engine deployment patterns to provide a document classification and indexing system 100 that is continually redeployed to meet user preferences, classification accuracy, and licensing requirements.

A discussion of the various classification engine deployment patterns referred to herein, and an algorithm for generating such patterns can be found in patent application Ser. No. 11/090,788, filed Mar. 25, 2005, entitled "Document Classifiers And Methods For Document Classification", which is fully incorporated herein by reference. Application Ser. No. 11/090,788 reviews the general problem area for document classification and the subsequent role of a document classifier (e.g., document classifier 102) for decreasing the mean number of putative classifications that must be considered by a document indexer (e.g., document indexer 104) to accurately index a document (i.e., identify and extract salient values from the fields of the document). Intelligent combination of document classification engines, as discussed in application Ser. No. 11/090,788, increases the likelihood of achieving the best initial classification, and increases the relative classification rank of the "actual" or "best" classification even when the initial classification is incorrect.

The different effects of some of the classification engine combination patterns on this "central tendency" can be shown to illustrate how differences depend not only on the pattern chosen, but also on the amount of "back-end" processing power available (which delimits how many candidate classifications can be tested by the indexing engines). Table 1, below, illustrates the central tendency results when three exemplary classifier engines are used (Classifier A, Classifier B, and Classifier C). Examples of typical classifier engines that may be appropriate include, Bayesian classifier engines, neural-net based classifier engines, genetic algorithm (GA) based classifier engines, and so on. Table 1 shows the mean number of classifications that have to be considered before finding the correct one. This is as a single metric that can be used to compare central tendencies. This value is obtained by finding the ranked order of the correct classification for each document, then determining the mean number of classes required from Mean=(Σranks/number of documents). If the ranks are all 1, then the mean will be 1.000 (a 100% perfect classifier). Tables 1-4 below, refer to some of the following classifier engine patterns, [1.]-[10.]:

1. Single Engine Pattern;

where the output of only a single engine (Classifier A, Classifier B, and Classifier C) is used for testing. To be better than the single engine, a useful pattern must outperform any of the three separate engines.

2. Majority Pattern;

where 2 or more of the three engines agree on their classification, or Best Engine (this ended up being Classifier B for all classification problems). This pattern did not outperform (1.) for any training set tested.

3. Best Engine w/Absolute Confidence or Second Best Engine Pattern;

where, if the best engine gives a certain probability threshold (e.g. >=0.75) for its "highest probability" classification, its output is accepted. Otherwise, the second engine is used. The "probability threshold" is varied from 0.50 to 1.00 step 0.05 (0.75 "usual"). This pattern did not outperform (1.) for any threshold tested.

4. Majority or Confusion Matrix Pattern;

where, if two of the three engines agree on their classification, the classification is accepted (same "Majority" as in [2.] above); otherwise, the "best" Weighted Confusion Matrix as described in pattern [9.] below. This pattern did not outperform (1.) for any training set tested.

5. Predictive Select Pattern;

where the training data (ground truth documents) is used to determine the precision of each engine for each class. During the test phase, the engine classification with the highest precision is accepted as correct. This approach did not outperform the best engine under any training set tested. However, when the algorithm was used in combination with a threshold and a confusion matrix as in pattern [9.] below, there was significant improvement over the best engine (that is, when the engine classifier was required to have a higher precision than the other two engines by an amount greater than or equal to a threshold, or else to use the confusion matrix, there was improvement). Thus, pattern [5.] was refined to Predictive Select w/Differential Precision or Confusion Matrix.

6. Best Engine w/Differential Confidence or Confusion Matrix Pattern;

The best engine was the Classifier B engine in every training set tested. The best engine was used with a differential confidence compared to the other two engines. This differential confidence value was varied from 0.00 to 0.40, step 0.05 (0.25 best). If the best engine did not have a differential confidence value for its highest vote over those of the other engines, the "best" Weighted Confusion Matrix was then used as described in pattern [9.] below. This pattern outperformed the best engine under most circumstances.

7. Best Engine w/Absolute Confidence or Confusion Matrix Pattern;

The best engine was the Classifier B engine in every training set tested. The best engine was used with an absolute confidence greater than a given threshold. This absolute threshold was varied from 0.50 to 1.00, step 0.05 (0.75 best). If the best engine did not have an absolute confidence value at or above this threshold, the "best" Weighted Confusion Matrix was used as shown in Table 3 below and described in pattern [9.] below. This pattern outperformed the best engine under most circumstances.

8. Straight Confusion Matrix Pattern;

This is the confusion matrix shown in Table 2 (described there as a "probability" confusion matrix, but as a pattern named the "straight" confusion matrix to disambiguate it from the "weighted" confusion matrix in pattern [9.]). The straight confusion matrix resulted in improvement over the best engine under virtually all training/testing situations.

9. Weighted Confusion Matrix Pattern;

This is a weighted form of "probabilistic confusion matrix", and provided significant improvement over the best engine under all training/testing conditions investigated. A wide variety of weights for the engines was shown to be effective, including weighting by engine accuracy and by assigning weights based on an assumption of engine voting.

10. Probability Space Correction+Weighted Confusion Matrix Pattern;

This special pattern is a combination of two meta-algorithmic patterns. The first is a "probability space correction" provided to transform the probabilities of the one or more engines (to "even the playing ground" among engines—that is, to make the mean differences between consecutively-ranked classes more similar), and the second is the same as pattern [9.] above. This resulted in significant improvement over the best engine.

TABLE 1

| Approach | Mean number of classifications until correct |
| --- | --- |
| 100% PERFECT classifier 1.000 | 1.000 |
| Classifier A | 2.877 |
| Classifier B | 1.904 |
| Classifier C | 1.891 |

TABLE 1-continued

| Approach | Mean number of classifications until correct |
|---|---|
| Pattern [9.] | 1.533 |
| Pattern [10.] w/(1.0, 0.208. 1.0) | 1.566 |
| Pattern [10.] w/(1.0, 0.208. 0.185) | 1.554 |

Table 1 shows the mean number of classifications the document indexer (e.g., document indexer 104) must evaluate before finding the correct classification when extracting indices from a document that has been classified by the various classifier engine patterns shown. Note that the Classifier C engine is slightly better than the Classifier B engine, and both of these are significantly better than the Classifier A engine. Patterns [9.] and [10.] offer significant improvement over the Classifier C engine, however, reducing the mean by from 17.2% to as much as 18.9%.

Another way of looking at this data is to see what percent of incorrect classifications remain after the first M (where M<=N, the total number of classes) ranked classes have been considered. This is shown in Tables 2-4, below, for Pattern [9.] and two Pattern [10.] variants.

TABLE 2

| M | Pattern [9.] | Classifier A | Classifier B | Classifier C | % Better |
|---|---|---|---|---|---|
| 1 | 20.13% | 37.59% | 22.69% | 28.69% | 11.3% |
| 2 | 9.61% | 27.12% | 12.00% | 16.16% | 19.9% |
| 3 | 6.13% | 21.70% | 8.21% | 10.98% | 25.3% |
| 4 | 4.28% | 18.07% | 6.60% | 7.63% | 35.2% |
| 5 | 3.08% | 15.70% | 5.44% | 5.70% | 43.4% |
| 6 | 2.28% | 13.61% | 4.58% | 4.56% | 50.0% |
| 7 | 1.73% | 11.73% | 4.19% | 3.59% | 51.8% |
| 8 | 1.19% | 9.85% | 3.81% | 2.63% | 54.8% |

Table 2 shows the remaining classification errors after the first M classes have been considered for Pattern [9.]. Note that the "% Better" column is for Pattern [9.] compared to the best performing single engine. Pattern [9.] is significantly better than any single engine, and its relative % Better increases with M.

In Table 3, there is a switch to the doubly-optimized Pattern [10.], for which the Classifier A, Classifier B, and Classifier C alpha values are 1.0, 0.208 and 0.185, respectively. In Table 3, below, an "optimum" M of 6 is noted. Also, as denoted by the interior horizontal line, the % Better column is higher for Table 3 compared to Table 2 (making Pattern [10.] the preferred pattern) only for M<=4; for M>4, Pattern [9.] provides better overall system accuracy.

TABLE 3

| M | Pattern [10.] | Classifier A | Classifier B | Classifier C | % Better |
|---|---|---|---|---|---|
| 1 | 19.74% | 37.59% | 22.69% | 28.69% | 13.0% |
| 2 | 9.36% | 27.12% | 12.00% | 16.16% | 21.9% |
| 3 | 5.78% | 21.70% | 8.21% | 10.98% | 29.6% |
| 4 | 4.10% | 18.07% | 6.60% | 7.63% | 37.9% |
| 5 | 3.13% | 15.70% | 5.44% | 5.70% | 42.5% |
| 6 | 2.42% | 13.61% | 4.58% | 4.56% | 46.9% |
| 7 | 1.97% | 11.73% | 4.19% | 3.59% | 45.1% |
| 8 | 1.56% | 9.85% | 3.81% | 2.63% | 40.7% |

Table 3 shows the remaining classification errors after the first M classes have been considered for Pattern [10.] with transformation alphas of (1.0, 0.208, 0.185) for (Classifier A, Classifier B, and Classifier C), respectively, followed by Pattern [9.]. Note that the "% Better" column is for Pattern [10.] compared to the best performing single engine. Note that here, unlike for Table 2, the relative % Better maximizes at M=6.

Table 4, below, considers the singly-optimized Pattern [10.], for which the Classifier A, Classifier B, and Classifier C alpha values are 1.0, 0.208 and 1.0, respectively. In Table 4, an "optimum" M of 6 is again noted. Also, as denoted by the interior horizontal line, the % Better column is higher for Table 4 compared to Table 2 (making Pattern [10.] the preferred pattern) only for M<=4; for M>4, Pattern [9.] provides better overall system accuracy. Thus, the final choice between Patterns for the overall indexing system will vary between Pattern [9.] and [10.] based on expected number of candidate classifications that will be available.

TABLE 4

| M | Pattern [10.] | Classifier A | Classifier B | Classifier C | % Better |
|---|---|---|---|---|---|
| 1 | 19.86% | 37.59% | 22.69% | 28.69% | 12.5% |
| 2 | 9.39% | 27.12% | 12.00% | 16.16% | 21.8% |
| 3 | 5.85% | 21.70% | 8.21% | 10.98% | 28.7% |
| 4 | 4.22% | 18.07% | 6.60% | 7.63% | 36.1% |
| 5 | 3.21% | 15.70% | 5.44% | 5.70% | 41.0% |
| 6 | 2.56% | 13.61% | 4.58% | 4.56% | 43.9% |
| 7 | 2.12% | 11.73% | 4.19% | 3.59% | 40.9% |
| 8 | 1.69% | 9.85% | 3.81% | 2.63% | 35.7% |

Table 4 shows the remaining classification errors after the first M classes have been considered for Pattern [10.] with transformation alphas of (1.0, 0.208, 1.0) for (Classifier A, Classifier B, and Classifier C), respectively, followed by Pattern [9.]. Note that the "% Better" column is for Pattern [10.] compared to the best performing single engine. Note that here, unlike for Table 2, but like for Table 3, the relative % Better maximizes at M=6.

As is apparent from the above, the Patterns [9.] and [10.] significantly increase the likelihood of automatically extracting correct index values for a given value of M in Tables 2-4.

The data shown above is from work on a prototype system, in which an existing document corpus of 20,000 pre-classified (into 20 classes) newsgroup articles was used.

Application Ser. No. 11/090,788 noted above, and incorporated herein by reference, provides a review of different combination patterns (e.g., patterns [1.]-[10.] above) used to combine various classification engines, and shows how a default classification engine or pattern of combined engines can be determined to provide the highest probability of correct document classification. As generally discussed in application Ser. No. 11/090,788, an algorithm executes available classifier engines against a known set of training documents (ground truth documents). Ground truth documents are organized according to a number of classifications, and within a given classification the ground truth documents include similar characteristics or traits. Each engine provides probabilities indicating the likelihood that a scanned document belongs in certain classifications. The algorithm sums the probabilities of the engines for each classification to determine the classification with the highest probability. The algorithm may also apply varying weights or confidence values to the probabilities based on how much the engines are trusted with respect to the known set of ground truth documents. A classifier engine or pattern of classifier engines can thus be determined to be the most accurate classification engine configuration (or pattern) for classifying documents related to the known set of ground truth documents.

Figure 2:
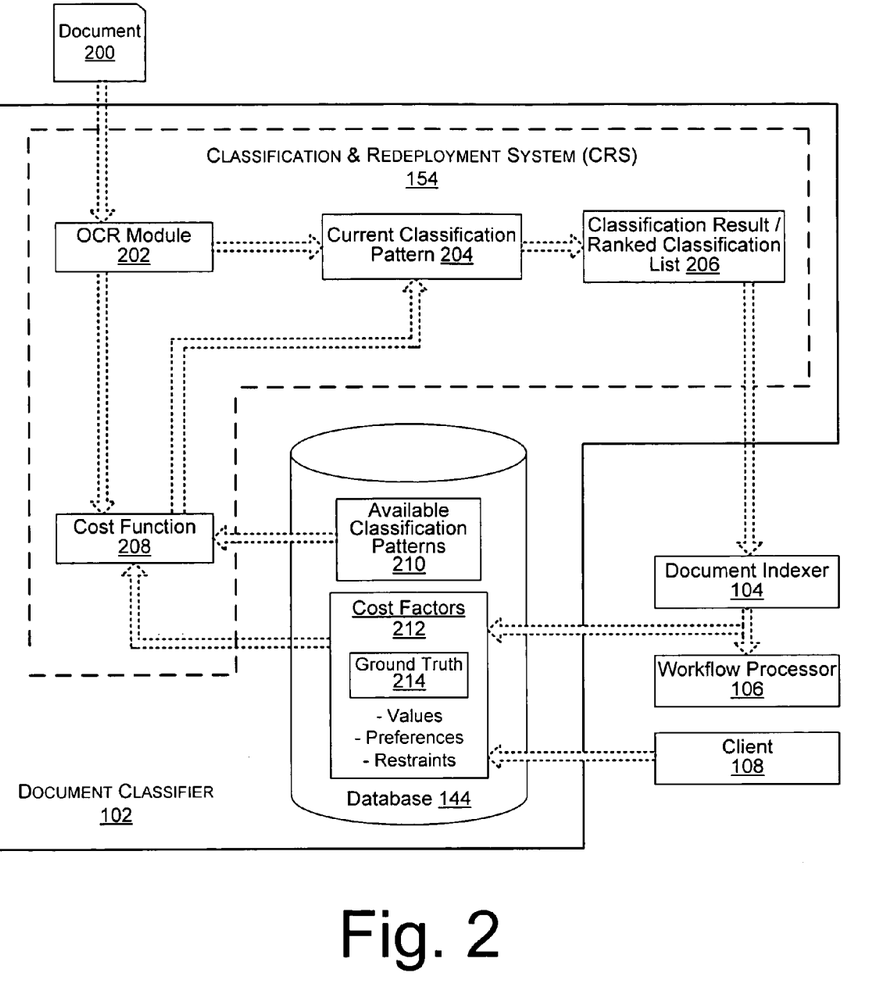
FIG. 2 illustrates an exemplary embodiment of a classification and redeployment system.

Referring now to FIG. 2, one embodiment of the classification and redeployment system (CRS) 154 from document classifier 102 is illustrated showing various components in a functional relation to the document indexer 104, workflow processor 106, and client 108 of FIG. 1. An initial, or default, classification pattern deployed as the current classification pattern 204 is determined as generally discussed above regarding application Ser. No. 11/090,788. The initial or default classification pattern is deployed to provide the highest probability of classifying documents correctly according to an initial set of ground truth training documents. As discussed further below, an initial or default classification pattern deployed as the current classification pattern 204, can be updated or redeployed, as a different classification pattern according to a cost function 208 derived by various cost factors 212.

In addition to the currently deployed classification pattern 204 of CRS 154, additional classification patterns 210 stored in database 144 may include different combinational patterns for combining classification engines, such as patterns [1.]-[10.] discussed above, and those discussed in application Ser. No. 11/090,788. However, it is noted that discussion and reference to application Ser. No. 11/090,788 and the patterns [1.]-[10.] above, is not intended to limit the types or number of additional classification patterns 210 available in database 144. For example, other patterns may also be available that combine more than three classification engines as is generally discussed in application Ser. No. 11/090,788. Accordingly, the additional classification patterns 210 may include engine combinations having, for example, five engines, seven engines, and so on.

Figure 3:
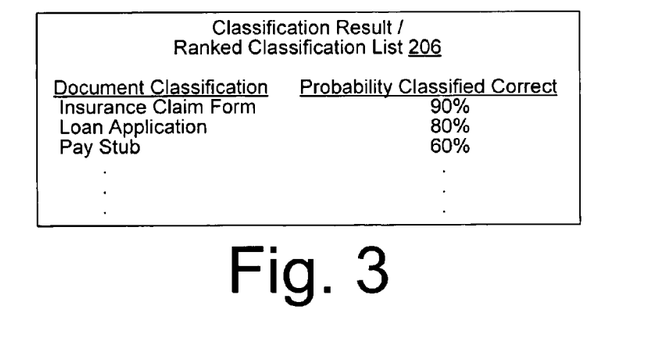
FIG. 3 illustrates an exemplary embodiment of a ranked classification list.

As shown in FIG. 2, a document 200 to be classified and indexed, is input (e.g., scanned in, loaded in from a storage device, etc.) into the classification and redeployment system (CRS) 154 of document classifier 102. The CRS 154 includes an OCR (optical character recognition) module 202 configured to convert the graphical document 200 into a text format if the document 200 is not already in such a format. In general, the document 200 is then processed for classification by the currently deployed classification pattern 204. The current classification pattern 204 typically generates a classification result 206 indicating the classification with which the document 200 is most likely associated. In addition, the deployed classification pattern 204 typically generates a plurality of classifications with which the document 200 might be associated, and ranks the classifications from highest to lowest in a classification list 206 that indicates the probability of correctness for each of the classifications. FIG. 3 illustrates an exemplary embodiment of a ranked classification list 206, showing several possible document classifications with which a document 200 may be associated according to results from the currently deployed classification pattern 204. It is noted that the document classifications and probabilities shown in FIG. 3 are for illustrative purposes only and that actual classifications and probabilities may vary significantly from those shown.

After a document 200 is processed by the CRS 154, the document indexer 104 attempts to index the document 200 according to the most probable classification indicated in the classification result/list 206. For example, referring to the ranked classification list 206 of FIG. 3, the document indexer 104 will first attempt to index document 200 as an insurance claim form, since the resulting classification list 206 from the classification engine pattern 204 indicates that the document 200 has the highest probability (i.e., a 90% probability) of being an insurance claim form document. Therefore, document indexer 104 may search for various insurance claim-related indices such as, for example, a policy number, a policy holder, a coverage limit, a deductible, and so on. If the document 200 is correctly classified as an insurance claim form, the document indexer 104 indexes the document 200 and passes the extracted indices and other appropriate information on to the workflow processor 106 to be put into an appropriate work flow.

However, if the document indexer 104 is unable to locate a threshold level of the expected indices for an insurance claim form document (e.g., a policy number, a policy holder, a coverage limit, a deductible), the indexer 104 begins the indexing process over, using the next highest probable classification. Using the classification list 206 of FIG. 3 as an example, the document indexer 104 would then begin indexing the document 200 as a loan application form.

In addition to passing extracted indices and other appropriate information on to the workflow processor 106, the document indexer 104 also passes information regarding the indexing process back into the database 144. This information may include, for example, data related to various cost factors 212, and may also include the document 200 itself to be added to the ground truth 214 if the document 200 was correctly classified. Cost factor data may include values for different cost factors generated during the indexing of document 200. Such cost factors are useful for deriving a cost function 208 as discussed below, and they may include, but are not limited to, the following cost factors:

1. Throughput/Performance:

This cost factor indicates how many documents need to be processed in a given amount of time, given the resources of the back-end system (the document indexer 104). If the system is bottlenecked, for example, the use of Pattern [1.] (see classifier engine patterns, [1.]-[10.], above) may be indicated (and simply the best engine will be used, rather than the more expensive—in terms of performance, at least—combinational patterns).

2. Minimum Distance from Correct Classification of the Individual Document's Assigned Class (See Tables 1-4 Above):

This cost factor can be described by way of an example; if many classifications can be accommodated during indexing, Pattern [9.] will be generally favored to Pattern [10.]. However, if only a few (or 1) classification/s can be considered, Pattern [10.] will be favored. While this factor is related to throughput, it is more closely related to the relative processing speed of indexing compared to the processing speed of classification.

3. Severity of Errors Made in Classification and Indexing:

This cost factor can relate to the "central tendency" as in the previous cost factor [2.], or else can correspond to the severity of an error when a document is of a particular class. In the latter case, a "Predictive Select" front-end (i.e., document classifier 102) can be used to determine what broad class of documents a given document corresponds to, and the more important classes can be differentially favored with greater processing time, as follows:

a. Predict the importance of the document (by length, ID of the person, user input of any means).

b. Assign relative resources (processing time, number of putative classifications to investigate during indexing, etc.) to the document.

c. Adjust notification threshold, etc., for contacting the user in case of presumed imperfect indexing. This cost function item then affects which pattern ([1.]-[10.] with variants) is selected for each of the documents. For example, suppose two documents are sharing a given block of processing time, and without bias towards one document, they can both utilize pattern [9.] with five classification candidates in the indexing stage. If, however, the second document is deemed more important, this may adjust the documents so that:

i). Document 1 uses pattern [10.] with 3 classification candidates during indexing.

ii). Document 2 uses pattern [10.] with 7 classification candidates during indexing.

4. Licensing Concerns (e.g., Excluding an Engine Based on Licensing Cost):

This cost factor is of a different type than the others, because it will bias toward classification engine patterns that exclude one or more of the classification engines. Note that the list of 10 patterns provided above is in reality a much larger family of patterns than shown. For example, Pattern [9.] can be applied using any 2 of the 3 exemplary engines, or all 3 engines (4 different implementations). However, if four engines are available, using any 2, any 3, or all four engines (i.e., 6, 4 and 1 implementations, respectively) results in 11 different implementations. Thus, if certain engines encumber licensing fees, patterns can be selected to steer around the more expensive licensed engines.

5. Differential Training (Ground Truthing) on the Multiple Classification/Indexing Engines:

This cost factor considers special-purpose engines that may be added to the system, in which case the classification pattern to be used may differ depending on the document type being analyzed. While related to the "Predictive Select" concept, this can simply be a matter of choosing an optimal deployment pattern for a given workflow, or a "shorthand for pattern selection" based on a user cue/preference. One manifestation is as follows:

a. Determine if the document is a member of a special class?

b. If yes, then apply the pattern specific to this special class.

c. If no, then apply the pattern as indicated after considering the other cost factors.

6. Automatic Updating:

This cost factor considers the retraining of the system and possible redeployment of the document classifier 102 system based on additional training (ground truthing) cases being added. This relates to the aspect of the document classifier 102 adaptability. As new ground truthed documents are added, the various patterns (e.g., classifier engine patterns, [1.]-[10.], above) are re-assessed against ground truth 214, and the relative efficacy of each pattern under the various conditions is updated. This can change the patterns chosen for deployment even in a "non-parsed" system (i.e., a system in which the cost function is static and so a single pattern is chosen). For example, the initially deployed default pattern could readily flip-flop between pattern [9.] and pattern [10.], depending on the ground truth data (and the number of classifications that can be considered during attempts to successfully index).

7. Relative Amount of Resources/Relative Availability of Resources Placed on the Front End Processing (Classification) and Back-End Processing (Indexing):

This cost factor is integrally related to cost factors [1.] and [2.], discussed above.

Referring again to FIG. 2, in addition to classifying a document 200 as discussed above, the classification and redeployment system (CRS) 154 continually re-evaluates the efficacy of the current classification pattern 204 in light of a potentially changing cost function 208 and ground truth 214. In this regard, the cost function 208 is derived based on user preferences regarding the cost factors 212 and on a particular set of ground truth 214. User preferences and/or restraints regarding cost factors 212 can be input by a user, for example, via client 108 as illustrated in FIG. 2. For example, a user may specify a minimum number of documents for processing per a given amount of time as a restraint on the cost factor [1.], throughput/performance.

As noted above, the ground truth 214 is updated as documents are processed by the document indexer 104 depending on the accuracy of classification of a document with respect to the ground truth. Likewise, values for various cost factors 212 may be updated in database 144 as documents are processed by the document indexer 104. For example, the document indexer 104 may provide cost factor data on the throughput/performance cost factor [1.], indicating the number of documents being processed on the front end document classifier 102 in a given time. As a further example, regarding cost factor [2.] (Minimum distance from correct classification of the individual document's assigned class), the document indexer 104 may provide information for a particular classified document, indicating a relative distance from correct classification the document was from its assigned class.

Given the various information about different cost factors 212 (i.e., cost factor values, cost factor user preferences/restraints) a cost function 208 is derived that uses the cost factors to determine whether the current classification pattern 204 should be replaced with another of the available classification patterns 210. Regarding the cost factor [5.], differential training (ground truthing) on the multiple classification/indexing engines, the cost function 208 may also be influenced by information from the OCR module 202 indicating which document type is being analyzed. In this instance, as noted above, an optimal deployment pattern may be deployed if the document is of a special class, with or without regard to data on other cost factors 212.

In general, however, the cost function 208 evaluates the available classification patterns 210 (which includes the current classification pattern 204) in light of changing information about different cost factors 212 (i.e., cost factor values, cost factor user preferences/restraints). These evaluations may occur, for example, periodically, at a preset time, based on a specific user instruction, based on one or more updated preferences, restraints, or values regarding one or more cost factors 212, and so on. Furthermore, the cost function 208 evaluates each of the available classification patterns 210 against the changing ground truth 214 to determine the efficacy of the currently deployed classification pattern 204. Based on evaluations of each classification pattern 210 against a specific set of current ground truth 214 and one or a plurality of different cost factors 212, the cost function 208 is used to determine which classification pattern 210 is most advantageous. If appropriate, the cost function 208 redeploys/replaces the current classification pattern 204 with a different classification pattern from available patterns 210.

In this way, a currently deployed classification pattern 204 is continually evaluated against changes in document ground truth and various classification and indexing related cost factors to ensure the most advantageous classification pattern 210 is deployed within the document classifier 102.

One more specific example of how the cost function 208 may function to redeploy a classification pattern might involve the cost of licensing a particular classification engine (cost factor [4.], above). For example, assume a currently deployed classification pattern 204 includes a combination of three classification engines (e.g., Classifier A, Classifier B, Classifier C), and that Classifier A is a public engine (no cost to use), while Classifiers B and C are licensed at a certain cost per copy used. If the licensing cost per use of Classifier C suddenly increases significantly, then the cost for using the currently deployed classification pattern 204 likewise increases significantly. In this case, each classification pattern 210 may be re-evaluated to determine if a pattern is available that does not include the use of Classifier C, and yet still meets user restraints/preferences regarding other cost factors, such as throughput/performance. The cost function may determine that it is better to redeploy a different classification pattern 210 in place of the current classification pattern 204 in order to avoid the cost of using the expensive Classifier C engine, even though the throughput/performance cost factor or some other cost factor might suffer.

Many scenarios are contemplated and will be apparent to one skilled in the art having the aid of this disclosure, whereby the cost function 208 evaluates cost factor and ground truth information and determines whether or not a current classification pattern 204 will be replaced based on tradeoffs between different cost factors, hard user restraints for different cost factors, and so on.

Exemplary Methods

Figure 4:
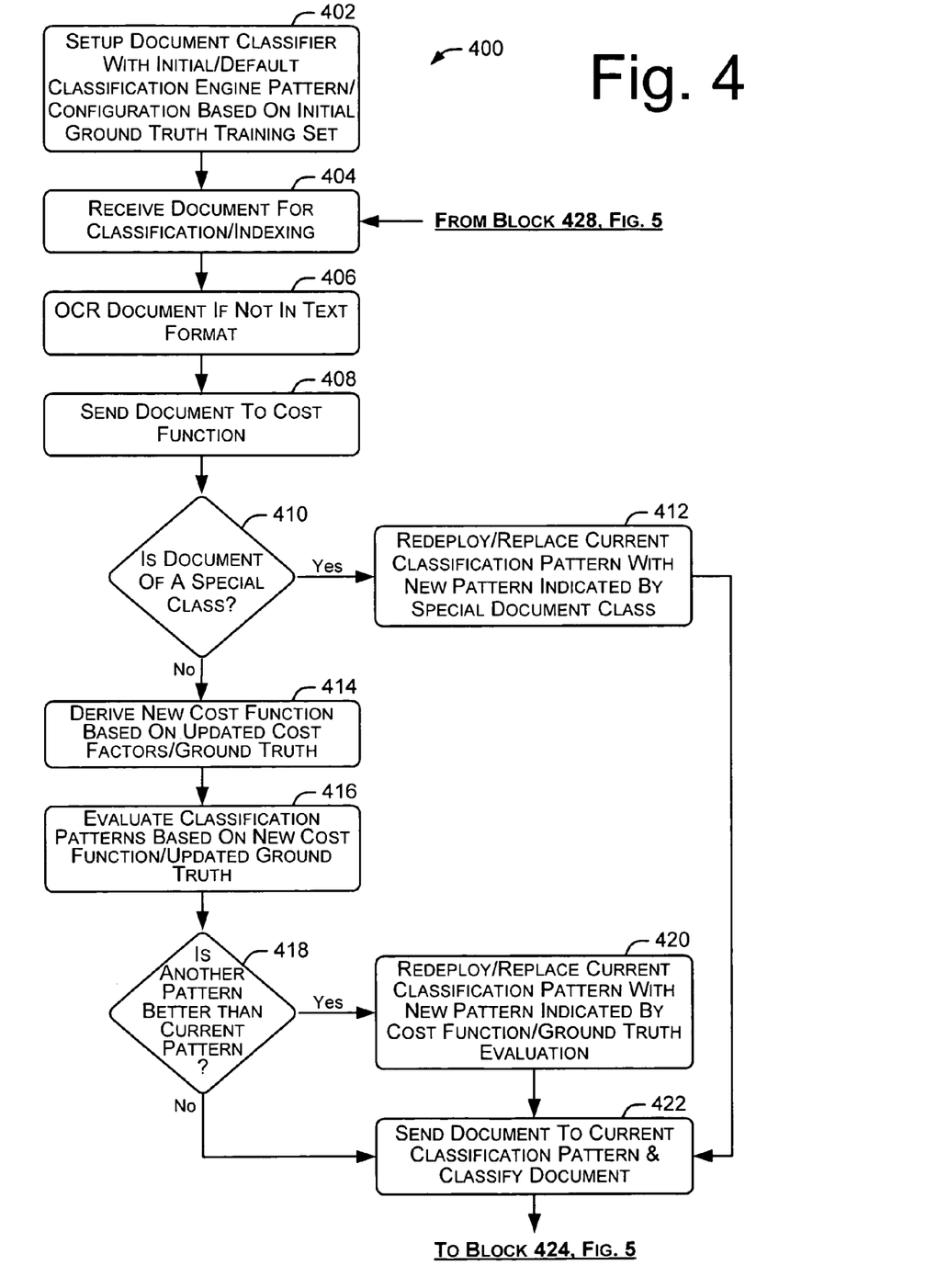
FIGS. 4-5 are flow diagrams illustrating exemplary embodiments of methods for implementing an adaptive document classifier in an exemplary classification and indexing system.

Example methods for implementing an adaptive document classifier in an exemplary classification and indexing system will now be described with primary reference to the flow diagrams of FIGS. 4 and 5. The exemplary methods apply generally to the exemplary embodiments discussed above with respect to FIGS. 1-3. While one or more methods are disclosed by means of flow diagrams and text associated with the blocks of the flow diagrams, it is to be understood that the elements of the described methods do not necessarily have to be performed in the order in which they are presented, and that alternative orders may result in similar advantages. Furthermore, the methods are not exclusive and can be performed alone or in combination with one another. The elements of the described methods may be performed by any appropriate means including, for example, by hardware logic blocks on an ASIC or by the execution of computer-readable instructions defined on a computer-readable medium.

Exemplary method 400 begins at block 402, with setting up a document classifier 102 with an initial (or default) classification engine pattern. This initially deployed default pattern is predetermined on the basis of an initial set of ground truth training documents. As noted above, determination of this default pattern and other patterns is explained in greater detail in application Ser. No. 11/090,788 (incorporated herein by reference), which generally provides a review of different patterns (e.g., patterns [1.]-[10.] above) used to combine various classification engines, and shows how a default classification engine, or pattern of combined engines, can be determined to provide the highest probability of correct document classification.

At block 404 of method 400, a document is received by the classification and indexing system. At block 406, if the document is not in a text format, the document is optically character recognized (OCR'd) to generate a text version of the document. The OCR'd document is then sent to a cost function as shown at block 408 for an initial determination regarding its document type.

Accordingly, at decision block 410, the cost function determines if the document is of a special class. This determination is made by the cost function, for example, by consulting a cost factor that identifies special classes of documents to which a specific classification engine pattern may be advantageously employed. If the cost function determines that the document is of a special class, at block 412, it redeploys or replaces the current classification pattern (note that initially, the current classification pattern is the default pattern setup as indicated in block 402) with a new pattern that is indicated through the cost function by the special document class. The document is then sent to the currently deployed pattern (which is now the new pattern just deployed) to be classified, as shown at block 422.

At block 414, if the document is not determined to be of a special document class, a new cost function is derived according to various other updated cost factors and ground truth. Updates to the cost factors can include updated user preferences or restraints on the cost factors and updated values related to the cost factors determined throughout the classification and indexing process. Updates to the ground truth can be made based on the relative success of indexing documents as discussed below regarding block 426.

At block 416, the available classification patterns are evaluated against the current/new cost function and the updated ground truth. At decision block 418, the cost function determines whether another classification pattern is better than the currently deployed pattern in light of the current cost factors and ground truth. At block 420, if another classification pattern is found to be better, the currently deployed pattern is redeployed/replaced by the new pattern indicated by the cost function and ground truth evaluation. The document is then sent to the currently deployed pattern (which is now the new pattern just deployed) to be classified, as shown at block 422.

If an evaluation of the classification patterns based on the current ground truth and cost function does not reveal a better classification pattern than the one currently deployed, then the deployed pattern remains in the system. The document is then sent to the currently deployed pattern and classified, as shown at block 422.

Figure 5:
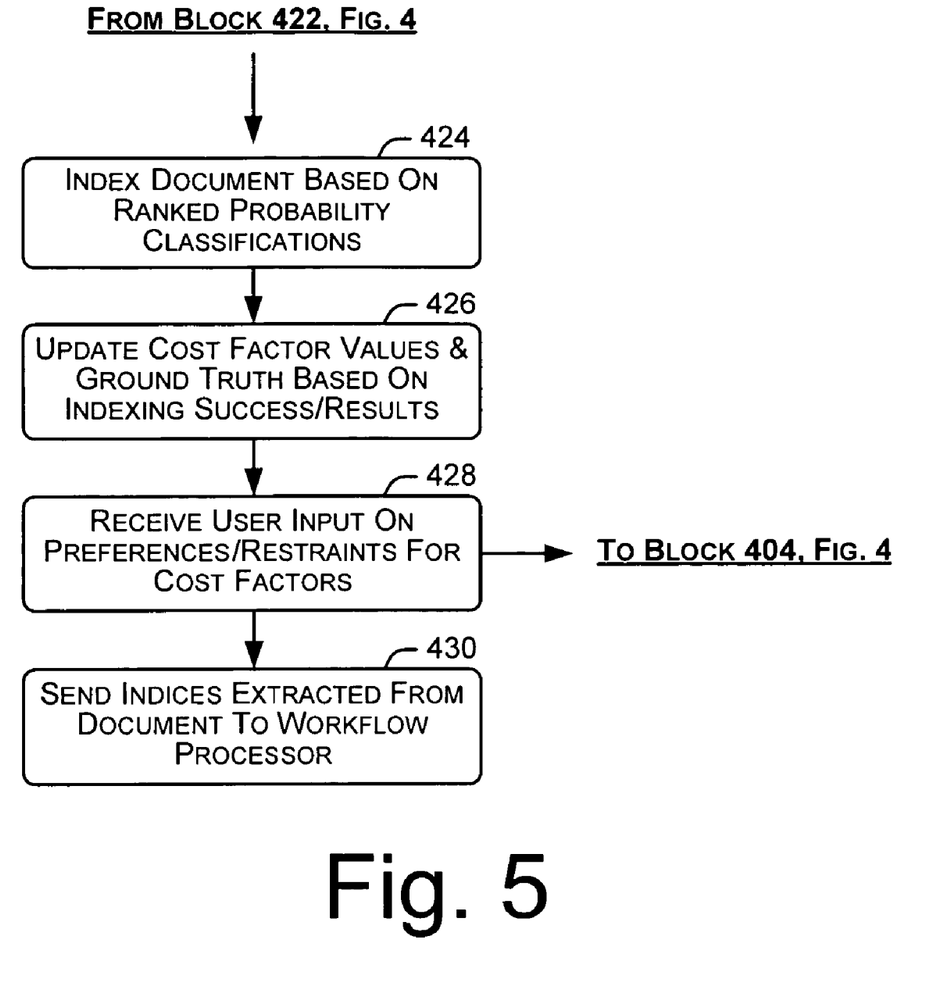

The method 400 continues at block 424 of FIG. 5. At block 424, the classified document is indexed by the document indexer according to its classification or its ranked probability for classification. That is, the indexer begins indexing the document based on the most probable classification provided by the document classifier. At block 426, the cost factor values and ground truth may be updated based on information determined from the indexing results. For example, if the classification information provided by the document classifier is correct, the document being indexed is added to the ground truth. Cost factors values, such as the minimum distance from correct classification (cost factor [2.], above), can also be updated in the database for later evaluation by the cost function.

At block 428, user preferences and/or restraints may be received for various cost factors. This generally may occur at anytime throughout the classification and indexing process. The information may be received from a user, for example, from a client device over a network. The process generally continues with additional documents entering the system at block 404, as indicated in FIG. 5.

At block 430, indices successfully extracted from a document are sent to a workflow processor to be applied to an appropriate workflow.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method for deploying a document classification system comprising:
deploying a document classification system with a first classification engine configuration, including generating a plurality of classifications with which a document is associated and ranking the classifications based on a probability of correctness for each of the classifications;
automatically redeploying the document classification system with a second classification engine configuration in response to a cost function based on a user preference regarding one or more cost factors selected from a throughput-performance cost factor indicating a number of documents processed by the document classification system in a given amount of time, a minimum distance cost factor indicating a minimum distance that a document classification is from the classified document's assigned class, a severity of errors cost factor indicating a severity of an error made in classifying and indexing a document, a licensing cost factor indicating a licensing cost for using a classification engine, a differential training cost factor indicating a particular type of ground truth document being analyzed, a retraining cost factor indicating retraining of the document classification system based on additional documents added to a set of ground truth documents, and a system resource cost factor indicating a relative amount of resources available for document classification on a front end of the document classification system and document indexing on a back end of the system.

2. A method as recited in claim 1, wherein automatically redeploying the document classification system comprises:
testing a plurality of classification engine configurations against the cost function;
determining which of the plurality of classification engine configurations performs best against the cost function; and
replacing the first classification engine configuration with another classification engine configuration if the first classification engine configuration does not perform best against the cost function.

3. A method as recited in claim 2, wherein the determining comprises determining that the second classification engine configuration performs best against the cost function, and the replacing comprises replacing the first classification engine configuration with the second classification engine configuration.

4. A method as recited in claim 1, further comprising indexing the document to one of the classifications based on the probability of correctness, including first attempting to index the document to a classification associated with a highest value of the probability of correctness.

5. A method as recited in claim 1, wherein the first classification engine configuration is based on an initial document training set and the second classification engine configuration is based on an updated document training set.

6. A method as recited in claim 1, wherein the first classification engine configuration employs a plurality of classification engines, and automatically redeploying the document classification system comprises:
incorporating into the cost function, an increased licensing cost associated with one of the plurality of classification engines; and
determining from the cost function, that the second classification engine configuration is preferable at least in part, because it does not employ the one of the plurality of classification engines.

7. A method as recited in claim 1, wherein automatically redeploying the document classification system comprises:
receiving a document;
determining that the document is of a special class; and
associating the second classification engine configuration with the special class.

8. A method as recited in claim 1, further comprising receiving user input on one or more preferences or restraints for the cost factors.

9. One or more computer-readable media having computer-executable instructions configured for:
determining a default classification engine configuration based on a document training set;
deploying the default classification engine configuration in a document classification system;
classifying one or more documents with the document classification system, including generating a plurality of classifications for each of the one or more documents and ranking the classifications based on a probability of correctness for each of the classifications;
updating the document training set based on the one or more documents; and
deploying a different classification engine configuration in the document classification system based on the updated document training set, the updated document training set including one or more cost factors selected from a throughput-performance cost factor indicating a number of documents that are processed by the document classification system in a given amount of time; a minimum distance cost factor indicating a minimum distance that a document classification is from the classified document's assigned class; a severity of errors cost factor indicating a severity of an error made in classifying and indexing a document; a licensing cost factor indicating a licensing cost for using a classification engine; a differential training cost factor indicating a particular type of ground truth document being analyzed; a retraining cost factor indicating retraining of the document classification system based on additional documents added to a set of ground truth documents; and a system resource cost factor indicating a relative amount of resources available for document classification on a front end of the document classification system and document indexing on a back end of the system.

10. One or more computer-readable media as recited in claim 9, wherein deploying the different classification engine configuration comprises:
testing the updated document training set against a plurality of classification engine configurations; and
determining that the different classification engine configuration provides more desirable document classification results when tested against the updated document training set than others of the plurality of classification engine configurations.

11. One or more computer-readable media as recited in claim 10, wherein the testing includes testing each of the plurality of classification engine configurations against a current cost function, wherein the cost function is based on current user preferences regarding the one or more cost factors.

12. A document classification and indexing system comprising:
a document classifier having a first classification engine configuration to generate a ranked classification list and classify documents based on an initial document ground truth set;

a document indexer configured to index documents classified by the document classifier based on the ranked classification list and to update the initial document ground truth set; and a cost function configured to incorporate the updated document ground truth set and test a plurality of classification engine configurations against the updated document ground truth set to determine whether the first classification engine configuration should be replaced, wherein the cost function is based on one or more cost factors selected from a throughput-performance cost factor indicating a number of documents that are processed by the document classification system in a given amount of time; a minimum distance cost factor indicating a minimum distance that a document classification is from the classified document's assigned class; a severity of errors cost factor indicating a severity of an error made in classifying and indexing a document; a licensing cost factor indicating a licensing cost for using a classification engine; a differential training cost factor indicating a particular type of ground truth document being analyzed; a retraining cost factor indicating retraining of the document classification system based on additional documents added to a set of ground truth documents; and a system resource cost factor indicating a relative amount of resources available for document classification on a front end of the document classification system and document indexing on a back end of the system.

13. A document classification and indexing system as recited in claim 12, wherein the cost factors influence the cost function in determining whether the first classification engine configuration should be replaced.

14. A document classification and indexing system as recited in claim 12, wherein the cost factors include associated values and user preferences that are alterable to further influence the cost function in determining whether the first classification engine configuration should be replaced.

15. A document classification and indexing system as recited in claim 12, further comprising an optical character recognition module configured to convert a scanned document into a text document.

16. A document classification and indexing system as recited in claim 12, wherein the document indexer is further configured to attempt to index the document based on each classification in the ranked classification list in an order from a most probable classification to a least probable classification.

17. A document classification and indexing system as recited in claim 12, further comprising a workflow processor configured to receive from the document indexer, indices extracted from the documents and to apply the indices to an appropriate workflow.

18. A document classification and indexing system comprising:

means for deploying a classification system with a first classification configuration based on a plurality of classifications with which a document is associated and a ranking of the classifications determined from a probability of correctness for each of the classifications; and means for automatically redeploying the classification system with a second classification configuration based on a cost function incorporating one or more cost factors selected from a throughput-performance cost factor indicating a number of documents that are processed by the document classification system in a given amount of time; a minimum distance cost factor indicating a minimum distance that a document classification is from the classified document's assigned class; a severity of errors cost factor indicating a severity of an error made in classifying and indexing a document; a licensing cost factor indicating a licensing cost for using a classification engine; a differential training cost factor indicating a particular type of ground truth document being analyzed; a retraining cost factor indicating retraining of the document classification system based on additional documents added to a set of ground truth documents; and a system resource cost factor indicating a relative amount of resources available for document classification on a front end of the document classification system and document indexing on a back end of the system.

* * * * *

UNITED STATES PATENT AND TRADEMARK OFFICE
CERTIFICATE OF CORRECTION

PATENT NO. : 7,734,554 B2  Page 1 of 1
APPLICATION NO. : 11/260786
DATED : June 8, 2010
INVENTOR(S) : Steven J. Simske et al.

It is certified that error appears in the above-identified patent and that said Letters Patent is hereby corrected as shown below:

In column 14, line 57, after "sent" insert -- on --.

Signed and Sealed this

Fifth Day of October, 2010

David J. Kappos
*Director of the United States Patent and Trademark Office*